June 23, 1964    C. J. BAUDER ETAL    3,138,077
FILTER PLEATING APPARATUS
Filed March 7, 1960    6 Sheets-Sheet 2

INVENTOR.
CARL J. BAUDER
PAUL M. ENGLE
BY
ATTORNEY

*INVENTOR.*
CARL J. BAUDER
PAUL M. ENGLE

June 23, 1964  C. J. BAUDER ETAL  3,138,077
FILTER PLEATING APPARATUS
Filed March 7, 1960  6 Sheets-Sheet 6

INVENTOR.
CARL J. BAUDER.
PAUL M. ENGLE.
BY

ATTORNEY

United States Patent Office 3,138,077
Patented June 23, 1964

3,138,077
FILTER PLEATING APPARATUS
Carl J. Bauder and Paul M. Engle, Syracuse, N.Y., assignors to Cambridge Filter Manufacturing Corporation, Syracuse, N.Y., a corporation of New York
Filed Mar. 7, 1960, Ser. No. 13,318
16 Claims. (Cl. 93—84)

This invention relates to air filters having an inexpensive elongated filter cartridge unit employing pleated filter media, and more particularly to apparatus for the economical manufacture thereof.

In filter cartridge units employing pleats of filter media extending crosswise of an elongated unit, the number of pleats is greatly increased in order to obtain a desired filter area. The present invention is directed to apparatus for quickly and economically forming the pleats of such filter units, and for holding the pleated media in pleated formation while completing the unit by enclosing the media in and securing the pleat edges to a surrounding frame of light weight economical fibrous sheet material. The unit so constructed is employed in a suitable frame wherein it is readily insertable and replaceable, as often as the unit becomes fouled.

The apparatus comprises a pleating mechanism having two series or sets of hinged leaves adapted to be alternately moved in sequence into an inter-leaving arrangement, to form pleats in the filter media. The apparatus further has provision for removing one of the sets of hinged leaves from the pleated media, while the pleats are supported upon the other set, during application of the supporting structure to complete the unitary cartridge.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 4 is an enlarged fragmentary side elevational view of the left hand end of the lower carriage with the hinge plates or leaves retracted;

FIGURE 5 is an employed fragmentary side elevational view of the left hand end of the upper carriage, with the hinge plates or leaves retracted;

Figure 1:
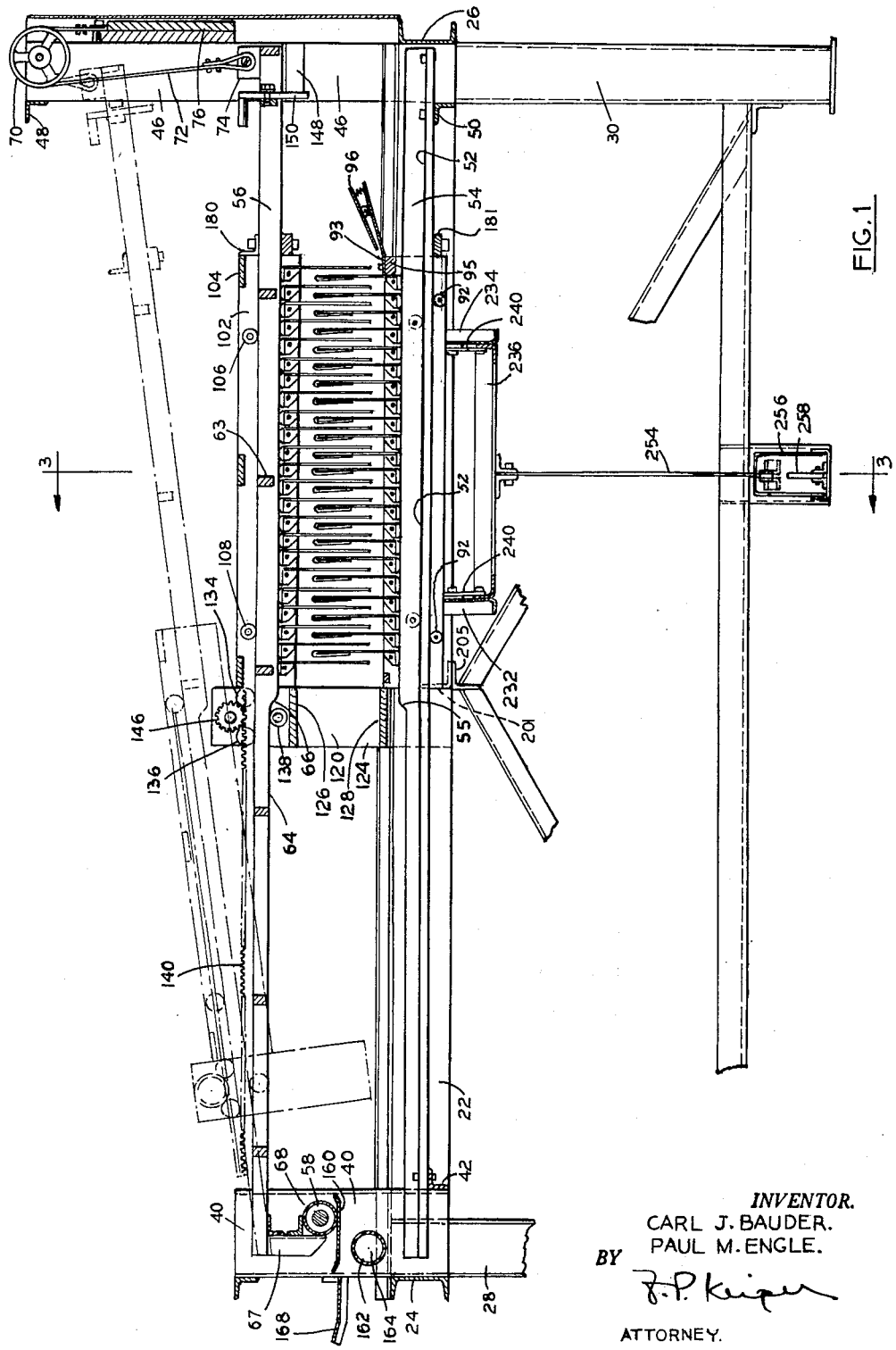
FIGURE 1 is a longitudinal sectional view through the apparatus taken substantially on the line 1—1 of FIGURE 2.
Figure 2:
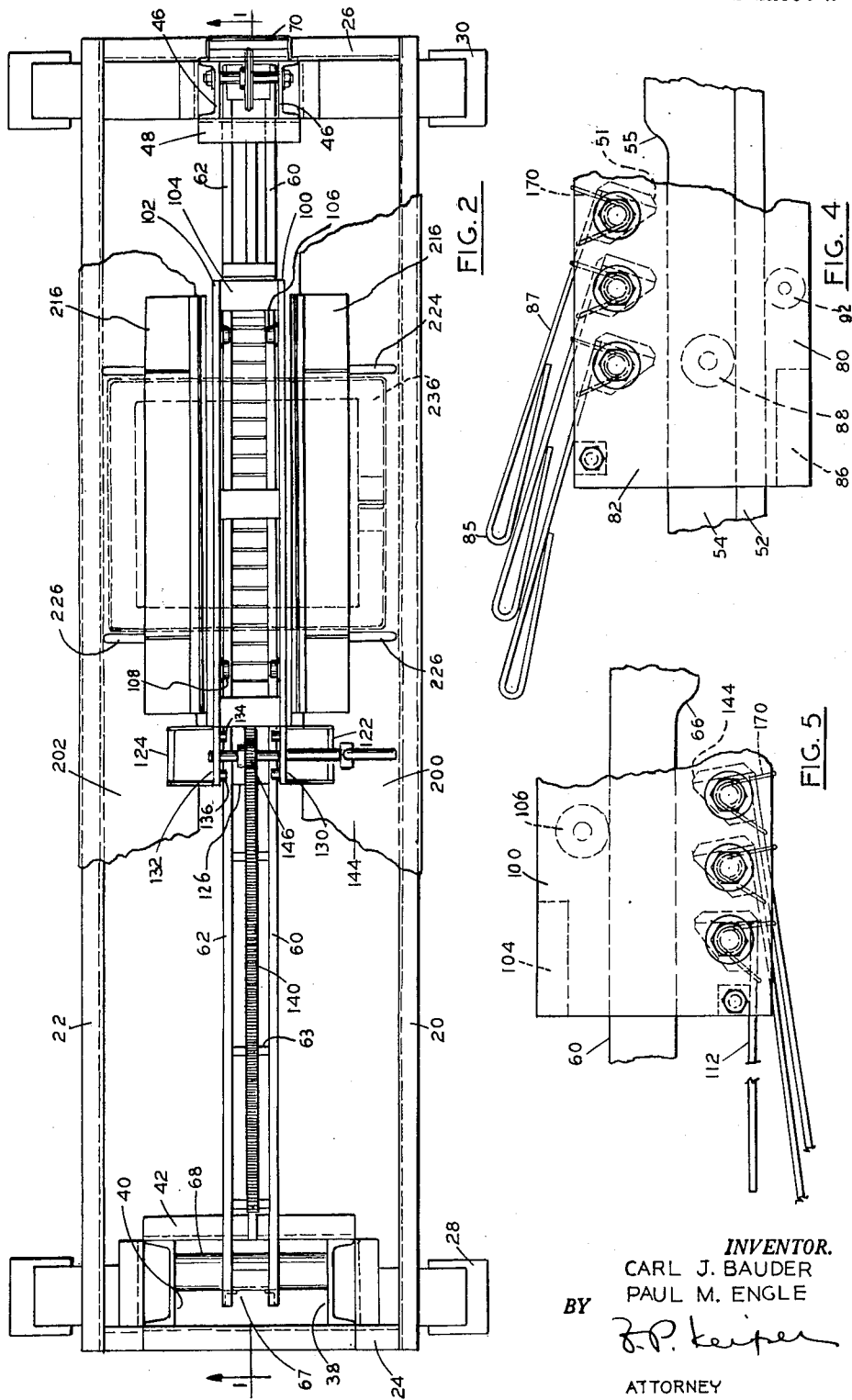
FIGURE 2 is a top plan view of the apparatus, with parts broken away.
Figure 3:
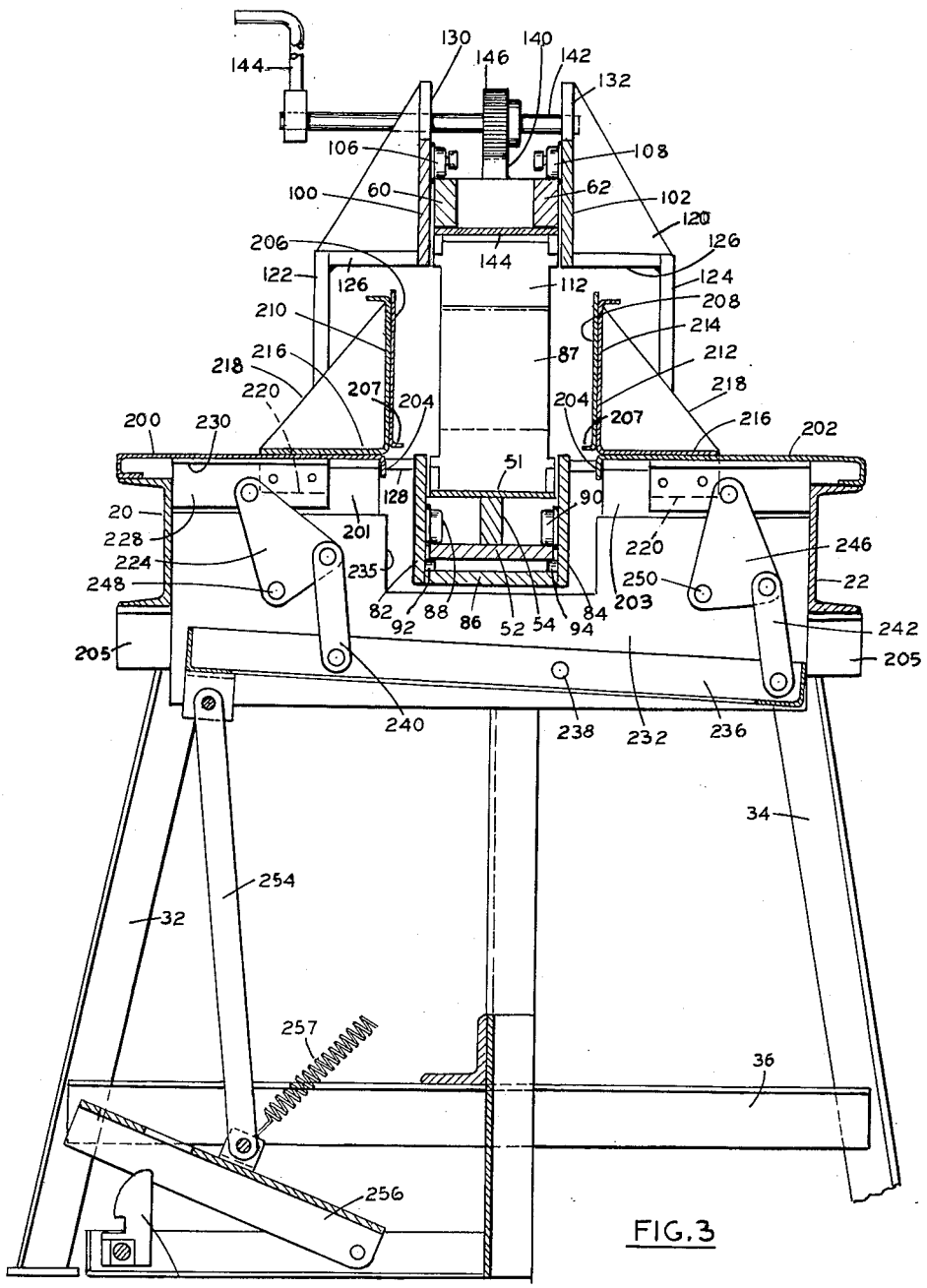
FIGURE 3 is a transverse sectional view taken substantially on the line 3—3 of FIGURE 1.
Figure 6:
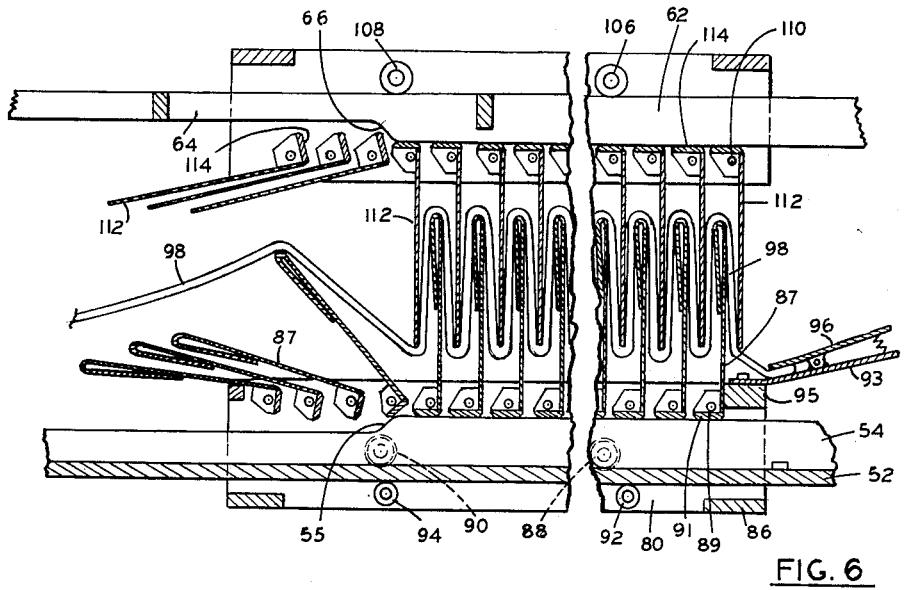
FIGURE 6 is an enlarged fragmentary longitudinal section of the lower and upward carriages in the region of the trackway leaf actuating cams.
Figure 7:
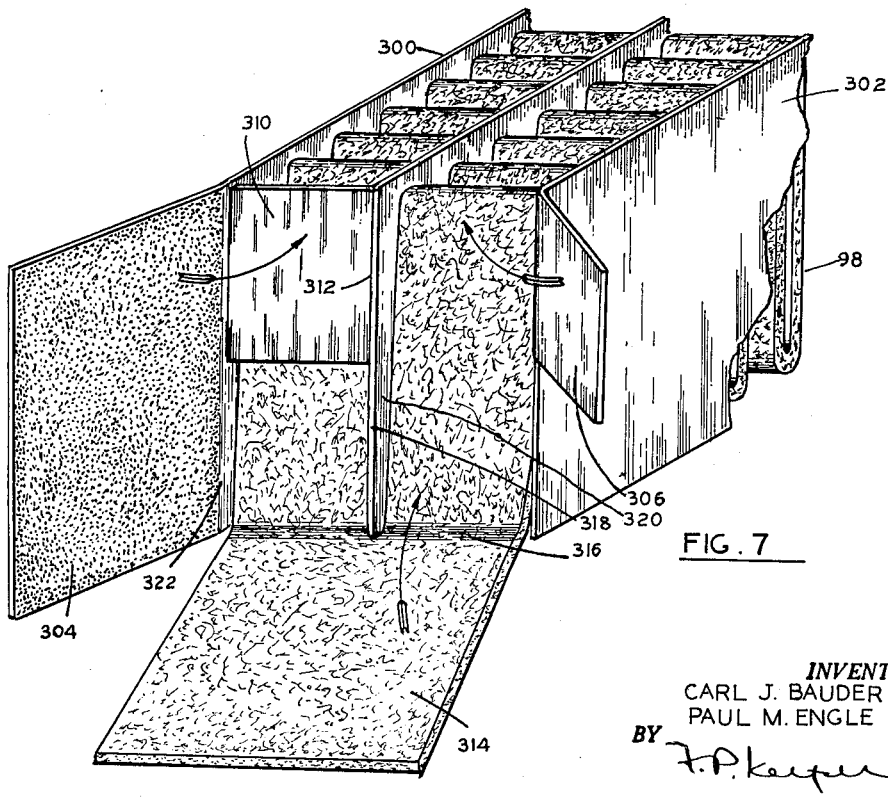
FIGURE 7 is a fragmentary perspective view of the filter unit in an intermediate stage of manufacture.
Figure 8:
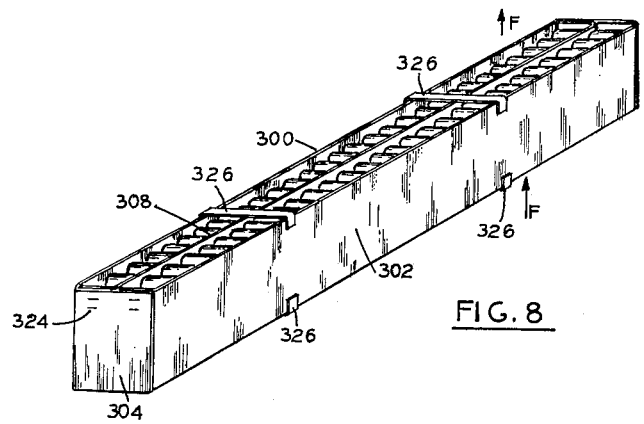
FIGURE 8 is a perspective view of a completed filter unit.
Figure 9:
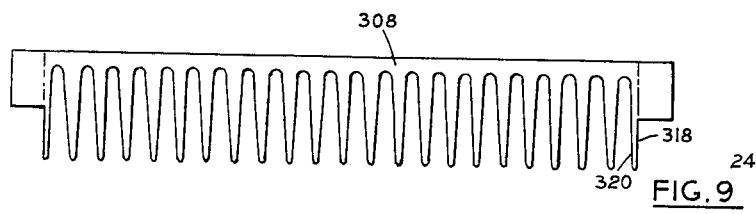
FIGURE 9 is a plan view of spacer comb blank employed in the unit.
Figure 10:
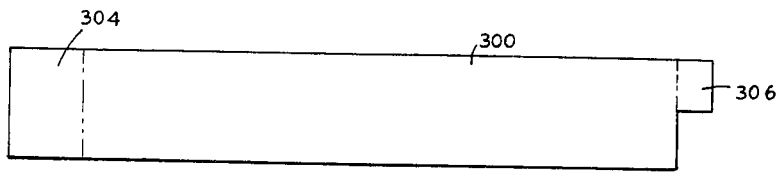
FIGURE 10 is a plan view of one of the side wall members in blank form.
Figure 11:
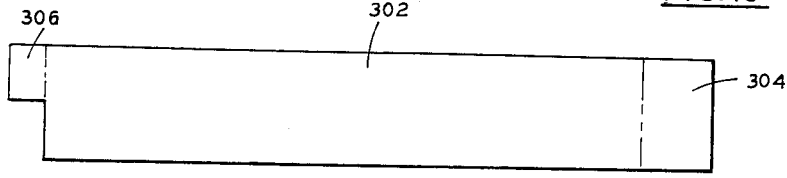
FIGURE 11 is a plan view of the other of the side wall members in blank form.
Figures 12, 13, 14:
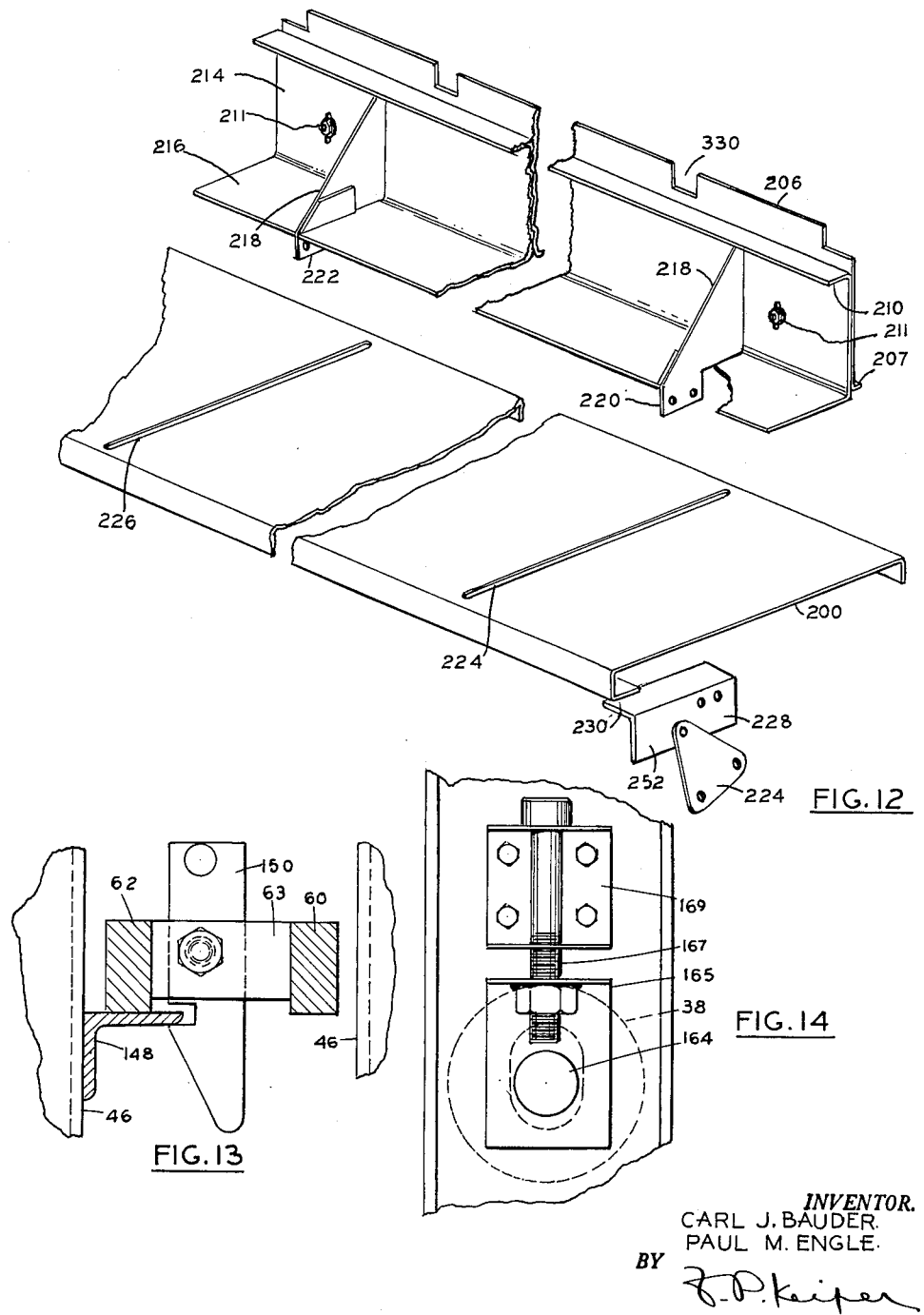
FIGURE 12 is a perspective fragmentary exploded view of one of the decks, and the sliding side wall support members, and the actuating cam disposed below the deck.
FIGURE 13 is a fragmentary elevational view of the upper trackway lock.
FIGURE 14 is a fragmentary elevational view of the roller adjustment for the incoming filter media.

Referring to FIGURES 7 and 8 of the drawings there is shown a filter cartridge unit employing filter media 98 in pleated formation disposed in an elongated rectangular frame composed of side members 300 and 302 having end flaps formed of heavy cardboard or the like, adhesively secured to the edges of the pleated media, as will be more fully referred to hereinafter.

The apparatus for forming the unit comprises a frame having an elongated bed composed of spaced channel members 20 and 22 connected together at their opposite ends by transverse channel members 24 and 26, the bed being supported on leg frames 28 and 30, each comprising spaced legs 32 and 34 tied together near their lower ends by horizontal tie members 36.

At the left hand end of the machine there is a pair of spaced upright channels 38 and 40 secured by one of the flanges of each to the end member 24, the other flanges of the channel members being tied together at their lower ends by an angle member 42. At the right hand end of the apparatus there is also a pair of upright spaced channel members 46 secured by one of the flanges of each to the end member 26, the channel members being tied together at their upper end as by an angle member 48. The channel members 46 form a guideway. The other flanges of the channel members at their lower end are connected by an angle member 50.

A lower trackway 52 is provided with an upstanding central cam rib 54 and extends from the transverse angle member 42 at one end and to the angle member 50 at the other end and is supported thereby. The cam rib 54 has a cam rise 55 intermediate its length. An upper trackway 56 overlies the lower trackway and is pivoted at one end on a pivot pin 58 extending between the upright channel members 38 and 40 at the left hand end. The upper trackway comprises a pair of spaced rails 60 and 62 having on their under surfaces a cam contour 64 having a cam rise 66. The rails 60 and 62 are tied together at spaced intervals along their length by transverse tie bars 63 and at the left hand end there is provided a depending bracket construction 67 having at its lower end a bearing sleeve 68, through which the pivot pin 58 extends.

The other end of the upper trackway projects into the vertical guideway space between the right hand upright members 46. The right hand end of the upper trackway is adapted to move from a horizontal position as shown, to an angularly upwardly inclined position (shown in dotted lines). There is provided between the upright angle members 46 at the right hand end, a counter-balance mechanism comprising a pulley 70 located between the upper ends of the spaced channel members 46 over which extends a cable 72, connected at one end to spaced brackets 74 on the upper side of the upper trackway at its right hand end, and at its other end to a counter balance weight 76.

Riding on the lower trackway is a carriage 80 composed of spaced side members or plates 82 and 84 connected together by several transverse members 86. Each of the side plates is provided with two flanged rollers 88 and 90 adapted to ride upon the upper and outer marginal edges of the trackway 52. Beneath the trackway and supported from the side plates are additional pairs of rollers 92 and 94 which normally clear the under surface of the trackway and serve to constrain the carriage against upward movement. It will be seen that the web or rib 54 of the lower trackway constitutes a cam in that approximately midway of its length the cam rise 55 provides an increase in the height of the web.

Pivoted between the side plates 82 and 84 of the lower carriage adjacent the upper edges thereof are a plurality of spaced hinged rectangular blades or plates 87 pivotally mounted on pintles 89. The plates or leaves 87 are adapted to lie substantially flat when the carriage is located at the left hand end of the apparatus. Each of the plates is provided with a cam follower member 91 which is adapted to engage the camming shoulder or rise 55 of the cam web 54 as the carriage is moved from left to right, the cam follower serving to cause each respective blade upon engaging the camming shoulder 55 to be pivoted to an upright position. Each of the plates 87 has a curved upper edge 85 formed by a return bent portion of each plate. At the forward or right hand end of the lower carriage there is provided a lead plate 93, mounted on the transverse member 95, which has at its forward end a spring clip 96 suitable to releasably grip the end of a strip of filter media 98.

The upper carriage comprises a pair of spaced side members or plates 100 and 102 disposed on the opposite sides of the spaced cam rails 60 and 62, the plates being tied together by three transverse members 104 extending between the plates adjacent the upper marginal edge thereof. Upon the inside faces of each of said plates are provided a pair of spaced flanged rollers 106 and 108 adapted to ride upon the upper faces of the cam rails 60 and 62. Pivoted between the plates adjacent the lower edges thereof at spaced intervals on pintles 110 are a plurality of hinged rectangular blades or plates 112 which are adapted to cooperate with the plates of the lower carriage. Each of the hinged plates or leaves 112 is provided with a cam follower 114 which rides along adjacent the under face 64 of the upper cam rails to cause the plates to move from an inclined nearly horizontal position to a depending vertical position, as the upper carriage is moved from left to right and as each cam follower engages and passes the cam rise 66. Coil springs 170 are provided for each plate 112, to bias the same to return to the inclined position, and similar springs 170 may be employed in conjunction with the plates 87, to likewise bias the plates to return to the inclined position.

A follower or pusher 120 for moving both carriages simultaneously along their respective trackways from left to right is mounted so as to ride upon the portion of the upper rails 60 and 62 to the left of the cam rises 66. Such follower comprises a transverse rectangular frame, having side members 122 and 124, and upper and lower cross bars 126 and 128. The right hand edges of the bars 126 and 128 lie in a common plane transverse to the cam rails. The upper and lower bars of the frame are adapted to abut the left hand ends of each of the upper and lower carriages. The follower frame is provided with upstanding spaced ears 130 and 132 disposed on either side of the cam rails 60 and 62 of the upper trackway, the ears extending upwardly above the trackway. Each of the ears is provided with three rollers 134, 136 and 138 on their inside faces, two rollers 134 and 136 being adapted to roll on the upper face of the respective cam rails of the upper trackway and the third roller 138 being disposed between the rollers 134 and 136 below the rail and adapted to roll on the under surface of the cam rail over that portion of its length to the left of the cam rises 66 provided for actuating the pivoted plates 112.

Disposed on the left hand end of the upper trackway on the upper side thereof is an elongated rack 140, and extending between the upper ends of the ears of the follower is a manually operated shaft 142 having a hand crank 144 at one end and a pinion 146 keyed to the shaft intermediate the ears and adapted to engage the rack 140.

The right hand end of the upper trackway when in a horizontal position rests upon an angle bracket 148 secured on the inside face of one of the channel member uprights 46 at the right hand end of the apparatus, and a latch mechanism 150 cooperating with the flange of the bracket 148 is pivoted as at 151 on a member 63 to hold the right hand end of the upper trackway in horizontal position resting on the angle bracket 148.

Disposed between the upright channels 38 and 40 at the left hand end of the apparatus is a curved plate 160 beneath which the incoming strip of filter media enters the apparatus, and beneath such plate there is provided a guide roller 162 mounted on a transverse shaft 164 which may be adjusted vertically in slots 165 in the uprights 38 and 40 by raising or lowering bearing blocks 165 suspended from adjustment screws 167 extending through brackets 169 affixed to the uprights 38 and 40.

Extending to the left of the uprights 38 and 40 at the left hand end is a guide shoe 168 in the form of a wide transverse channel beneath which the incoming filter media passes as it is drawn from a supply roll (not shown).

When it is desired to pleat a section of filter media for forming a pleated filter assembly or unit, the pusher member 120 is moved to the extreme left along the upper trackway and the upper and lower carriages are likewise rolled along their respective trackways to the extreme left. The upper trackway is in its inclined position, its right hand end being elevated by the counter balance 76. The hinged plates or leaves of each of the carriages are disposed in inclined position as for example indicated in FIGURES 4 and 5.

With the upper trackway lifted, an end of the strip of filter media is pulled over the roller 162 between the uprights 38 and 40 and the end of the media is drawn through the rectangular frame of the pusher member 120 and through the space between the carriages, and the free end is secured to the spring clip 96 on the lower carriage. The upper trackway and carriage is then lowered to the horizontal position, and the trackway secured by the latch mechanism 150. Thereafter manual rotation of the crank upon the pusher member simultaneously advances both carriages together along their respective tracks, the bars 126 and 128 of the pusher frame engaging the ends of the upper and lower carriages respectively.

It will be understood that the pivotal plates 112 and 87 of the upper and lower carriages respectively are mounted on pivots bearing a staggered relation to each other, while the cam rises 66 are directly above the cam rise 55. Thus as the carriages are simultaneously advanced, the pivotal plates of the carriages successively and alternately engage the respective cam rise 55 of the lower web cam and the rise 66 of the upper cam rails 60 and 62 and are one after the other caused to swing to a vertical interleaved position as the carriages are simultaneously advanced together from left to right. The action rapidly draws a considerable length of filter media from the supply reel as the plates 112 and 87 swing to a vertical position, causing the media to be sequentially arranged into a series of pleats as the carriages are simultaneously advanced to their right hand end positions. The stop angle 180 and block 181 on the upper rails and lower trackway provide an end position for the movement of the carriages.

When the carriages reach the end position, the pusher member is moved back to the extreme left where it is out of the way, the latch mechanism 150 which holds the right hand end of the upper trackway downward in the horizontal position is released, and the upper trackway swung to the inclined position (indicated in dotted lines), such action being facilitated by the counterbalance 76. Such action raises the upper carriage with its depending plates 112 out of engagement with the pleats just formed, and the upper carriage may thereafter be rolled manually to the left along the upper trackway, where it is out of the way, and to provide clearance around the pleated filter media which remains supported upon the upwardly extending plates 87 of the lower carriage.

Mounted on each of the spaced frame channel members 20 and 22 are elongated deck members 200 and 202, the inner marginal edges 204 of which substantially close off the space through which the lower carriage travels in moving from left to right and back again. The deck members are supported centrally by short channel brackets 201 and 203 extending inwardly from the frame members 20 and 22 and affixed to the transverse angle iron 205. Adjacent the station where the pleated filter media is located and supported on the lower carriage plates 87, after removal of the upper carriage, there are provided a pair of oppositely laterally moving elongated vertical plates 206 and 208 which are adapted to receive the side members 300 and 302 employed for completing the filter cartridge. The plates have a narrow ledge-like flange 207 on which the lower edge of the side members rest. It will be understood that the side members for completing the filter cartridge unit are supported upon the plates 206 and 208 and are provided with adhesive on their inside surfaces. The side plates are moved laterally toward each other causing the adhesively coated surface of the side members to engage under light pressure the side edges of the pleated filter material.

Each of the plates 206 and 208 is adjustably supported as at 211 upon lengthwise extending angle members 210 and 212 having an upright portion 214 and a horizontal portion 216 and such angle members are provided with triangular brace members 218. Depending from the under side of the horizontal portion of each angle member 210, 212 are a pair of depending tongues 220 and 222 which extend through spaced transverse slots 224 and 226 in each of the respective deck members. Attached to each tongue beneath the deck member is a flanged slider 228, the upper flange 230 of which bears upon the under face of the deck and provides an adequate support to the angle member so that the upstanding plates 206, 208 thereof are maintained true and perpendicular as when the side plates are pressing the adhesively coated side members 300 and 302 against the filter media 96.

Extending between the main frame members adjacent each of the slider members are transverse plate members 232 and 234. The plates 232 and 234 are cut away as at 235 to clear the lower carriage. A rigid rectangular lever frame 236 is disposed between said plates 232 and 234 and is pivoted to the plates to one side of the center thereof as at 238. The opposite ends of the side members of the lever frame are connected by links 240 and 242 to bell cranks 244 and 246 pivoted upon the transverse plate members 232 and 234, as at 248 and 250, and the bell cranks are pivoted to the depending flanges 252 of the sliders 228. A linkage 254 extends from the lever frame to a foot treadle 256 disposed on the floor so that an operator may actuate the lever frame at will and cause the plates 206 and 208 to move toward the filter media or away from the filter media. The floor treadle is provided with a latch 258 so that when the plates 206 and 208 are moved toward one another to apply the adhesively coated side members to the pleated filter media, the plates may be held in position compressing the members against the side edges of the pleated media without fatigue to the operator, it being understood that the side elements with adhesive on their inside faces must be held in engagement with the edges of the pleated filter media for a period of time sufficient to allow the adhesive to set.

While the pleated filter medium is supported on the upstanding blades or leaves 87 of the lower carriage, the side members 300 and 302, which have their inside faces coated with adhesive, are positioned on the plates 206 and 208 with the lower edges of the side members resting on the narrow flange or ledge 207. At this time, through operation of the treadle 256, the plates are moved toward the side edges of the pleated media to cause the adhesive coated faces to engage under light pressure with the side edges of the media.

Each of the side members is provided with rectangular end flaps 304 and 306, one approximating the dimensions of the end of the filter unit, and the other being half as wide and extending downwardly from the upper edge, a little more than half way. While the side members 300 and 302 are compacted against the side edges of the filter media, a comblike member 308 is inserted to render support to the media, and prevent collapse when the filter is put to use, under differential pressure caused by air flow in the direction of arrows F. Such member is provided with end flaps 310 of approximately the same rectangular shape as the end flap 306 of the side members. When the comb is in place, the flap 310 at one end is swung on its score 312 to lie in a plane transverse of the length of the filter, and thereafter, the flap 306 of the side member 302 is bent to lie in the same plane with flap 310. Adhesive may be applied to the outer surfaces of these flaps at this time. Thereafter the end of the filter medium 314 which has held in the clamp 96 is released, and folded along the line 316 so that the end extends in a vertical plane against the edge 318 of the last half tooth 320 of the comb and against the outer surfaces of flaps 306 and 310. Thereafter flap 304 is bent along its scoring 322 so as to lie across the end, with the end 314 of the filter media disposed between the flaps 310 and 306 and flap 304. A number of staples 324 may thereupon be inserted through the flap 306 and flap 304, with the end of the filter media sandwiched between, and additional staples may be inserted through flap 310 and flap 304, likewise with the end of the filter media sandwiched therebetween.

The filter media at the other end of the unit is cut from the source of supply with a length similar to that previously held in the clip 96. Thereafter the end flaps of the comb, and the side members are closed in, sandwiching the filter media and therebetween in the same manner as previously described for the other end, staples being inserted to hold the sandwiched material and overlapping flaps together, while the adhesive sets.

Thereafter one or more narrow strips of Scotch tape 326, or other similar adhesive tape may be applied across the filter as at suitably spaced intervals, the number depending on the overall length of the filter unit. Such tapes resist any strain which might tend to spread the side members apart from the filter media. It will be observed that the side plates 206 and 208 are notched as at 330 to facilitate the application of such strips on one side of the unit, while the filter unit is still held between the plates.

When the plates 206 and 208 are spread apart, by release of the treadle lock 258, and action of the spring 257, the filter unit is lifted from the vertical blades or leaves 87 of the lower carriage. The unit may then be turned upside down on a bench, and a number of strips of adhesive tape placed across the opposite side as indicated in FIGURE 8, to provide protection against the side members spreading on the air inlet side.

When the unit is removed from the lower carriage, the carriage is moved to the left hand end of the machine, the upper carriage having been previously moved to the left hand end, together with the rack operated pusher. Thereafter the end of the filter medium supply is drawn across the lower carriage, and secured in the clamp 96, the upper trackway lowered, and the upper and lower carriages moved to the right by the pusher to commence the forming of the pleats, in the course of manufacture of the succeeding filter unit.

It will be seen that by the relative movement between the pleating carriage assemblies, and the actuating means, the cam, for causing the pleating leaves to move sequentially to interleaving relations, the filter media is rapidly drawn into pleated formations. Thereafter by bodily moving one of the assemblies away from the other, the other assembly acts as a support for the media while side members are applied to complete the filter unit.

The apparatus may be readily changed to accommodate wider or narrower filter media, to vary the number of pleats, and to vary the depth of the pleats, the latter, being accomplished as by raising or lowering one of the trackways, as, for example, the lower trackway. The filter media may be a composite of layers of different material, and may have included a thin mesh fabric on one side to provide sufficient tensile strength to the filter media proper which might lack sufficient tensile strength during the pleating operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

A divisional application to the filter has been filed under No. 190,968 on April 30, 1962.

What is claimed is:

1. Apparatus for the manufacture of pleated air filter units comprising a frame, a lower trackway mounted on the frame, an upper trackway mounted on the frame and extending parallel with the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other and into interleaving relation upon simultaneous movement of said carriages.

2. Apparatus for the manufacture of pleated air filter units comprising a frame, a lower trackway mounted on the frame, an upper trackway mounted on the frame and extending parallel with the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other and into interleaving relation upon simultaneous movement of said carriages along said trackway, and pusher means adapted to move along one of the trackways in engagement with both carriages, for simultaneously moving both carriages along the trackway.

3. Apparatus for the manufacture of pleated air filter units comprising a frame, a lower trackway mounted on the frame, an upper trackway mounted on the frame and extending parallel with the lower trackway, carriages mounted for movement on each of said trackways, each of said carriages having a plurality of pleating plates pivotally mounted thereon on axes transverse of the trackway, a guide at one end of the frame between the trackways for filter media in strip form, means for securing an end of filter media to be drawn through said guide and pleated to an end of one of said carriages remote from said guide, means associated with each of said trackways and said plates for swinging the plates of each of said carriages alternately and sequentially to a vertical position extending from one carriage toward the other into interleaving relation upon simultaneous movement of said carriages along said trackways.

4. Apparatus for the manufacture of pleated air filter units comprising a frame, a lower trackway mounted on the frame, an upper trackway mounted on the frame and extending parallel with the lower trackway, carriages mounted for movement on each of said trackways, each of said carriages having a plurality of pleating plates pivotally mounted thereon on axes transverse of the trackway, a guide at one end of the frame between the trackways for filter media in strip form, means for securing an end of filter media to be drawn through said guide and pleated to an end of one of said carriages remote from said guide, means associated with each of said trackways and said plates for swinging the plates of each of said carriages alternately and sequentially to a vertical position extending from one carriage toward the other into interleaving relation upon simultaneous movement of said carriages along said trackways, and pusher means adapted to move along one of the trackways in engagement with both carriages, for simultaneously moving both carriages along the trackway.

5. Apparatus for the manufacture of pleated air filter units comprising a frame, a lower trackway mounted on the frame, an upper trackway pivotally mounted on the frame at one end and adapted to extend parallel with the lower trackway or on an angle away from the lower trackway, means for securing said upper trackway in parallel relation to the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other into interleaving relation upon simultaneous movement of said carriages along said trackways when said trackways are disposed parallel with each other.

6. Apparatus for the manufacture of pleated air filter units comprising a frame, a lower trackway mounted on the frame, an upper trackway pivotally mounted on the frame at one end and adapted to extend parallel with the lower trackway or on an angle away from the lower trackway, means for securing said upper trackway in parallel relation to the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other into interleaving relation upon simultaneous movement of said carriages along said trackways when said trackways are disposed parallel with each other, and pusher means adapted to move along one of the trackways to simultaneously move both carriages along their respective trackways.

7. Apparatus for the manufacture of pleated air filter units comprising a frame, a lower trackway mounted on the frame, an upper trackway pivotally mounted on the frame at one end and adapted to extend parallel with the lower trackway or on an angle away from the lower trackway, means for securing said upper trackway in parallel relation to the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other into interleaving relation upon simultaneous movement of said carriages toward one end of said trackways and along said trackways when said trackways are disposed parallel with each other, and plate members disposed on opposite sides toward one end of the trackways and mounted on the frame for sliding movement laterally toward and away from one of said carriages for moving filter unit side members into engagement with the side edges of pleated filter media.

8. Apparatus for the manufacture of pleated air filter units comprising a frame, a lower trackway mounted on the frame, an upper trackway pivotally mounted on the frame at one end and adapted to extend parallel with the lower trackway or on an angle away from the lower trackway, means for securing said upper trackway in parallel relation to the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other into interleaving relation upon simultaneous movement of said carriages toward one end of said trackways and along said trackways when said trackways are disposed parallel with each other, pusher means adapted to move along one of the trackways to simultaneously move both carriages along their respective trackways, and plate members disposed on opposite sides toward one end of the trackways and mounted on the frame for sliding movement laterally toward and away from one of said carriages for moving filter unit side members into engagement with the sided edges of pleated filter media.

9. Apparatus for the manufacture of pleated air filter units comprising a frame, a lower trackway mounted on the frame, an upper trackway pivotally mounted on one end of the frame and adapted to extend parallel with the lower trackway or at an angle thereto, means for securing said upper trackway in parallel relation to the lower trackway, carriages mounted for movement on each of said trackways, each of said carriages having a plurality of pleating plates pivotally mounted thereon on axes transverse of the trackway, means associated with each of said trackways and said plates for swinging the plates of each of said carriages alternately and sequentially to a vertical position extending from one carriage toward the other in interleaving relation upon simultaneous movement of said carriages along said trackways, means for counterbalancing the other end of the upper trackway, and laterally moveable means mounted on the frame on opposite sides of the lower trackway towards the other end of said frame for applying side members to pleated filter media disposed on the lower carriage.

10. Apparatus for the manufacture of pleated air filter units comprising a frame, a lower trackway mounted on the frame, an upper trackway pivotally mounted on one end of the frame and adapted to extend parallel with the lower trackway or at an angle inclined away therefrom, means for locking said upper trackway in parallel relation to the lower trackway, carriages having rollers mounted for movement on each of said trackways, each of said carriages having a plurality of pleating plates pivotally mounted thereon on axes transverse of the trackway, cam means associated with each of said trackways midway of the length thereof and cam follower means affixed to each of said plates for swinging the plates of each of said carriages alternately and sequentially to a vertical position extending from one carriage toward the other in interleaving relation upon simultaneous movement of said carriages along said trackways from one end to the other.

11. Apparatus for the manufacture of pleated air filter units comprising a frame, a lower trackway mounted on the frame, an upper trackway pivotally mounted on one end of the frame and adapted to extend parallel with the lower trackway or at an angle inclined away therefrom, means for locking said upper trackway in parallel relation to the lower trackway, carriages having rollers mounted for movement on each of said trackways, each of said carriages having a plurality of pleating plates pivotally mounted thereon on axes transverse of the trackway, cam means associated with each of said trackways midway of the length thereof and cam follower means affixed to each of said plates for swinging the plates of each of said carriages alternately and sequentially to a vertical position extending from one carriage toward the other in interleaving relation upon simultaneous movement of said carriages along said trackways from one end to the other and pusher means having rollers engaging the upper trackway adapted to move both carriages simultaneously from the one end of the frame to the other.

12. Apparatus for the manufacture of pleated air filter units comprising a frame, a lower trackway mounted on the frame, an upper trackway pivotally mounted on one end of the frame and adapted to extend parallel with the lower trackway or at an angle inclined away therefrom, means for locking said upper trackway in parallel relation to the lower trackway, carriages having rollers mounted for movement on each of said trackways, each of said carriages having a plurality of pleating plates pivotally mounted thereon on axes transverse of the trackway, cam means associated with each of said trackways midway of the length thereof and cam follower means affixed to each of said plates for swinging the plates of each of said carriages alternately and sequentially to a vertical position extending from one carriage toward the other in interleaving relation upon simultaneous movement of said carriages along said trackways from one end to the other, pusher means having rollers engaging the upper trackway adapted to move both carriages simultaneously from the one end of the frame to the other, and means on the forward end of the lower carriage for holding an end of filter media to be pleated.

13. Apparatus for the manufacture of pleated air filter units comprising a frame, a lower trackway mounted on the frame, an upper trackway pivotally mounted on one end of the frame and adapted to extend parallel with the lower trackway or at an angle inclined away therefrom, means for locking said upper trackway in parallel relation to the lower trackway, carriages having rollers mounted for movement on each of said trackways, each of said carriages having a plurality of pleating plates pivotally mounted thereon on axes transverse of the trackway, cam means associated with each of said trackways midway of the length thereof and cam follower means affixed to each of said plates for swinging the plates of each of said carriages alternately and sequentially to a vertical position extending from one carriage toward the other in interleaving relation upon simultaneous movement of said carriages along said trackways from one end to the other, pusher means having rollers engaging the upper trackway adapted to move both carriages simultaneously from the one end of the frame to the other, means on the forward end of the lower carriage for holding an end of filter media to be pleated, and means laterally movable on said frame and disposed on opposite sides of the lower trackway near the other end thereof for pressing side members against filter media, while the media is supported on the plates vertically disposed adjacent the lower carriage.

14. Apparatus for the manufacture of pleated air filter units comprising spaced pleating assemblies, each assembly comprising a pair of parallel side plates, and a plurality of substantially rectangular pleating leaves pivotally mounted on uniformly spaced axes extending between the pair of plates and lying in a common plane, means for supporting said assemblies with the said pivot planes parallel to one another and spaced by a distance slightly greater than the length of the leaves with the axes of the leaves of one assembly staggered in relation to the axes of the leaves of the other assembly, cam means including cam followers affixed to each leaf adjacent their respective pivots for alternately and sequentially swinging said leaves of both assemblies one after the other into interleaving relation to one another and positions perpendicular to the planes of the axes of the leaves, and means for bodily moving one of said assemblies with its leaves disposed perpendicular to the plane of the axes of the leaves, out of interleaving relation to the leaves of the other assembly.

15. Apparatus for the manufacture of pleated air filter units comprising spaced pleating assemblies, each assembly comprising a pair of parallel side plates, and a plurality of substantially rectangular pleating leaves pivotally mounted on uniformly spaced axes extending between the pair of plates and lying in a common plane, means for supporting said assemblies with the said pivot planes parallel to one another and spaced by a distance slightly greater than the length of the leaves with the axes of the leaves of one assembly staggered in relation to the axes of the leaves of the other assembly, means for sequentially swinging said leaves of both assemblies into interleaving relation to one another and positions perpendicular to the planes of the axes of the leaves, means for bodily moving one of said assemblies with its leaves disposed perpendicular to the plane of the axes of the leaves, out of interleaving relation to the leaves of the other assembly, and means associated with the other assembly for applying side members to the side edges of pleated filter media supported on the leaves of said other assembly.

16. Apparatus for the manufacture of pleated air filter units comprising spaced pleating assemblies, each assembly comprising a pair of parallel side plates, and a plurailty of substantially rectangular pleating leaves pivotally mounted on uniformly spaced axes extending between the pair of plates and lying in a common plane, means for supporting said assemblies with the said pivot planes parallel to one another and spaced by a distance slightly greater than the length of the leaves with the axes of the leaves of one assembly staggered in relation to the axes of the leaves of the other assembly, cam means including cam followers affixed to each leaf adjacent their respective pivots for alternately and sequentially swinging said leaves of both assemblies one after the other from one end to the other into interleaving relation to one another and positions perpendicular to the planes of the axes of the leaves, means for bodily moving one of said assemblies with its leaves disposed perpendicular to the plane of the axes of the leaves, out of interleaving relation to the leaves of the other assembly and means for biasing said leaves to swing toward a position parallel with the pivot axes planes, and toward said one end and against said sequential movement to the vertical position.

References Cited in the file of this patent

UNITED STATES PATENTS

| | | |
|---|---|---|
| 957,159 | Heister | May 3, 1910 |
| 1,666,074 | Steinhilber | Apr. 17, 1928 |
| 2,370,125 | Cronin | Feb. 27, 1945 |
| 2,514,801 | Sapp | July 11, 1950 |
| 2,589,792 | Frank et al. | Mar. 18, 1952 |
| 2,700,327 | Foster | Jan. 25, 1955 |
| 2,787,462 | Morin | Apr. 2, 1957 |
| 2,884,091 | Baldwin | Apr. 28, 1959 |
| 2,907,407 | Engle et al. | Oct. 6, 1959 |

FOREIGN PATENTS

| | | |
|---|---|---|
| 474,737 | Canada | July 31, 1951 |